United States Patent [19]

Cheng

[11] Patent Number: 5,732,503
[45] Date of Patent: Mar. 31, 1998

[54] ANT BLOCKADING APPARATUS

[76] Inventor: Chin-Yen Cheng, 49, West Yuan, Tsing-Hua Univ., Kuang-Fu Hsin-Chu, Taiwan

[21] Appl. No.: 654,092

[22] Filed: May 28, 1996

[51] Int. Cl.$^6$ ............................................. A01M 1/22
[52] U.S. Cl. ............................................. 43/112; 43/98
[58] Field of Search ............................ 43/112, 124, 132.1, 43/98

[56] References Cited

U.S. PATENT DOCUMENTS

| | | | |
|---|---|---|---|
| 1,024,060 | 4/1912 | Calvert | 43/98 |
| 1,031,492 | 7/1912 | Tuch | 43/98 |
| 1,049,177 | 12/1912 | Vetterlein | 43/98 |
| 1,541,985 | 6/1925 | Marquis | 43/98 |
| 2,030,310 | 2/1936 | McWilliams | 43/112 |
| 2,307,163 | 1/1943 | Shea | 43/112 |
| 2,516,264 | 7/1950 | Sheehy | 43/112 |
| 4,037,351 | 7/1977 | Springer | 43/112 |
| 4,949,500 | 8/1990 | Jefferys | 43/112 |
| 5,269,091 | 12/1993 | Johnson | 43/98 |
| 5,557,879 | 9/1996 | Oh | 43/112 |

FOREIGN PATENT DOCUMENTS 623049  6/1927  France ..................... 43/112

*Primary Examiner*—Kurt Rowan

[57] ABSTRACT

An ant blockading apparatus includes: an electric shock circuit board secured on a supporting column standing on a base member laid on a surface, and a platform mounted on an upper portion of the supporting column and positioned above the electric shock circuit board for placing a container of food or the like on the platform; the electric shock circuit board having a plurality of positive electrodes concentrically or parallelly formed on a bottom of the circuit board and electrically connected to a positive pole of a power source, and a plurality of negative electrodes concentrically or parallelly formed on the bottom of the circuit board and electrically connected to a negative pole of the power source, each positive electrode juxtapositional to each negative electrode having an electrically insulative medium sandwiched in between the positive and negative electrodes, whereby upon creeping of an ant over the positive and negative electrodes to shortcircuit the electrodes and the power source, an electric shock will be applied to the ant to cause its falling down or to repel it for preventing ant invasion into the container above the electric shock circuit board.

13 Claims, 4 Drawing Sheets

ANT BLOCKADING APPARATUS

BACKGROUND OF THE INVENTION

U.S. Pat. No. 4,869,015 entitled "Electric Shock Insect Repeller" disclosed an electric shock insecticide apparatus including a pair of electrodes having a voltage applied thereto and an insulation space defined between the two electrodes, with the electrodes circumferentially confining an opening or surrounding a door for closing or opening said opening, and a rib element disposed adjacent to the electrodes so as to surround said opening, thereby preventing invasion by the creeping animal such as cockroach into the storing space or living space.

However, such a conventional electric shock insect repeller has the following drawbacks:

1. The electrodes are provided to circumferentially surround an opening of the storing or living space, requiring specific designs and complex installation job to match with the special geometric structures of a kitchen furniture, a cabinet or rooms to thereby limit its diversified uses.

2. For confining an opening of a storing or living space with big area, the pair of electrodes should be carefully and precisely laid out to ensure the insulative spacing as sandwiched between the two electrodes to prevent short-circuiting between the electrodes, possibly causing installation complexity and increasing cost as well as maintenance problems.

3. A rib element is still required to surround the opening of the storing or living space. Even though the rib element may be made as a sealing member for well sealing a door opening to preclude the invasion by a cockroach. The rib element may not preclude a small ant invasion into the opening since the ant volume is greatly smaller than that of a cockroach.

Accordingly, the conventional insect repeller such as disclosed in U.S. Pat. No. 4,869,015 is not suitable for use in repelling or blockading an ant from invasion into a container stored with food or the like.

SUMMARY OF THE INVENTION

The object of the present invention is to provide an ant blockading apparatus including: an electric shock circuit board secured on a supporting column standing on a base member laid on a surface, and a platform mounted on an upper portion of the supporting column and positioned above the electric shock circuit board for placing a container of food or the like on the platform; the electric shock circuit board having a plurality of positive electrodes concentrically or parallelly formed on a bottom of the circuit board and electrically connected to a positive pole of a power source, and a plurality of negative electrodes concentrically or parallelly formed on the bottom of the circuit board and electrically connected to a negative pole of the power source, each positive electrode juxtapositional to each negative electrode having an electrically insulative medium sandwiched in between the positive and negative electrodes, whereby upon creeping of an ant over the positive and negative electrodes to shortcircuit the electrodes and the power source, an electric shock will be applied to the ant to cause its falling down or to repel it for preventing ant invasion into the container above the electric shock circuit board.

DETAILED DESCRIPTION

As shown in FIGS. 1-5, a preferred embodiment of an ant blockading apparatus of the present invention comprises: at least an electric shock means 1 secured on a supporting column 2, a platform 3 mounted on the supporting column 2 and positioned above the electric shock means 1, and a base member 4 secured to a lower portion of the supporting column 2 and laid on a surface S such as a table, a floor or a ground surface. The column 2 is perpendicular to either the platform 3 or to the base member 4. The circuit board 11 may also be embedded into a bottom of the platform 3.

Figure 6:
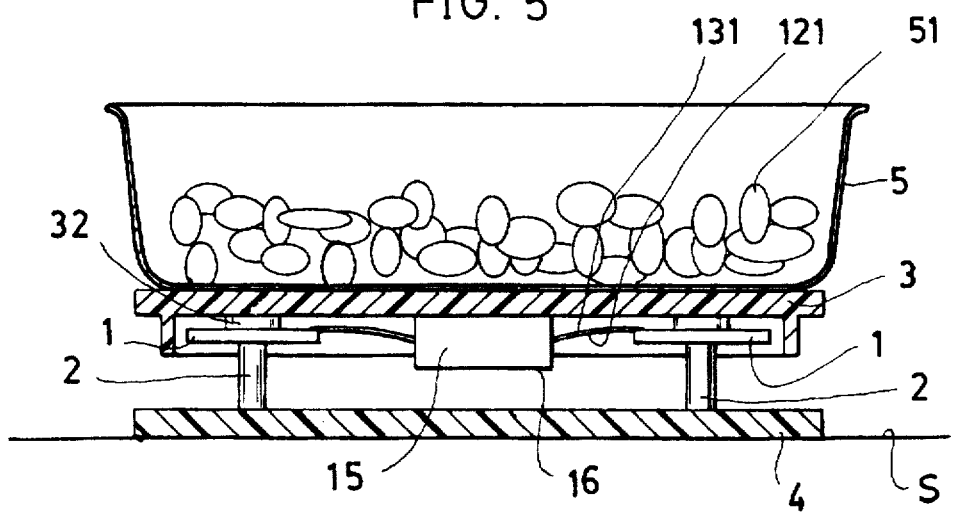
FIG. 6 is an illustration showing a food container placed on the present invention.

As shown in FIG. 6, a container 5 stored with food or other storing material 51 may be placed on the platform 3 for preventing invasion into the container by ants. Other modifications may be made for modifying the platform 3 and the base member 4 which will be further described hereinafter.

The electric shock means 1 includes: a circuit board 11 made of electrically insulative materials having a central hole 10 defined in a central portion of the circuit board 11, a plurality of first and second electrodes 12, 13 made of electrically conductive annular rings and concentrically formed on a bottom of the circuit board 11 about a center 100 of the board 11, each first electrode 12 separating from each second electrode 13 by an electrically insulative medium 14 annularly shaped and sandwiched between the first and second electrodes 12, 13, each first electrode 12 electrically connected to a positive pole 151 of a power source 15 through a first wire 121, each second electrode 13 electrically connected to a negative pole 152 of the power source 15 through a second wire 131, and a casing 16 for storing the power source 15, which may be a battery, in the casing 16 attached to a bottom of the platform 3 or to any other suitable locations.

The first and second electrodes 12, 13 and the wires 121, 131 connected between the electrodes and the power source 15 may be formed as a printed circuit board printed on the circuit board 11.

Each electrode 12 or 13 may have a preferred width of 2 mm, but not limited in the present invention.

The width of the electrically insulative medium 14 spaced between the first and second electrodes 12, 13 is preferably 0.5 mm to ensure a shortcircuiting caused by an ant A whose minimum length is generally larger than the width of the insulative medium 14.

The voltage between the two electrodes 12, 13 when powered may range from 7-50 volts and may be preferably at least 9 volts to effectively repel an ant. Even a small current of 5 micro amperes of the electric shock may repel the ant whose body resistance may be one mega ohms.

The supporting column 2 has an upper portion 21 secured with the circuit board 11 and the platform 3; and a bottom portion 23 secured on the base member 4.

The upper portion 21 of the column 2 may be formed with an upper screw hole 211 which is engageable with an upper screw 22 for inserting the screw 22 through a screw hole 31 formed through the platform 3 and a central hole 10 through the circuit board for securing the platform 3 and the circuit board 11 on the colume 2.

Figure 1:
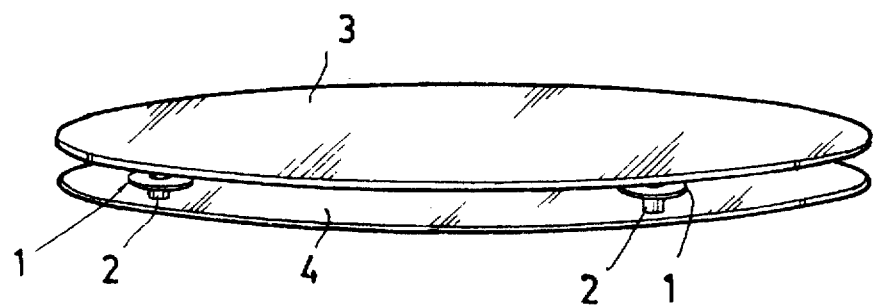
FIG. 1 is a perspective view of the present invention.
Figure 2:
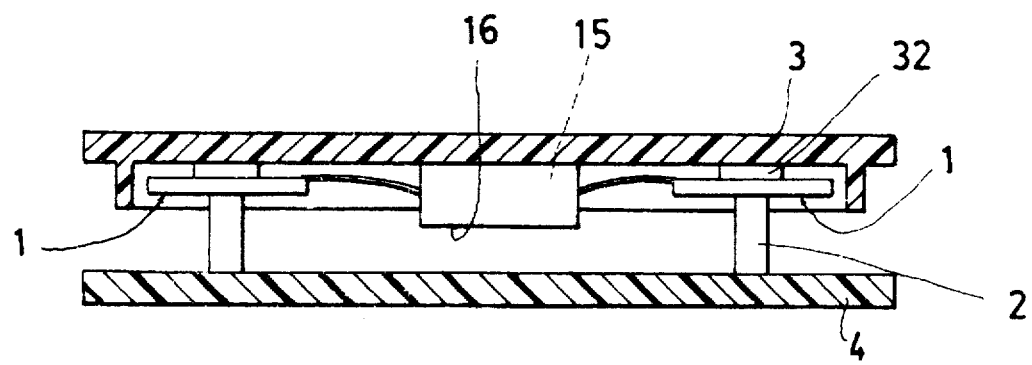
FIG. 2 is a longitudinal sectional drawing of the present invention.
Figure 3:
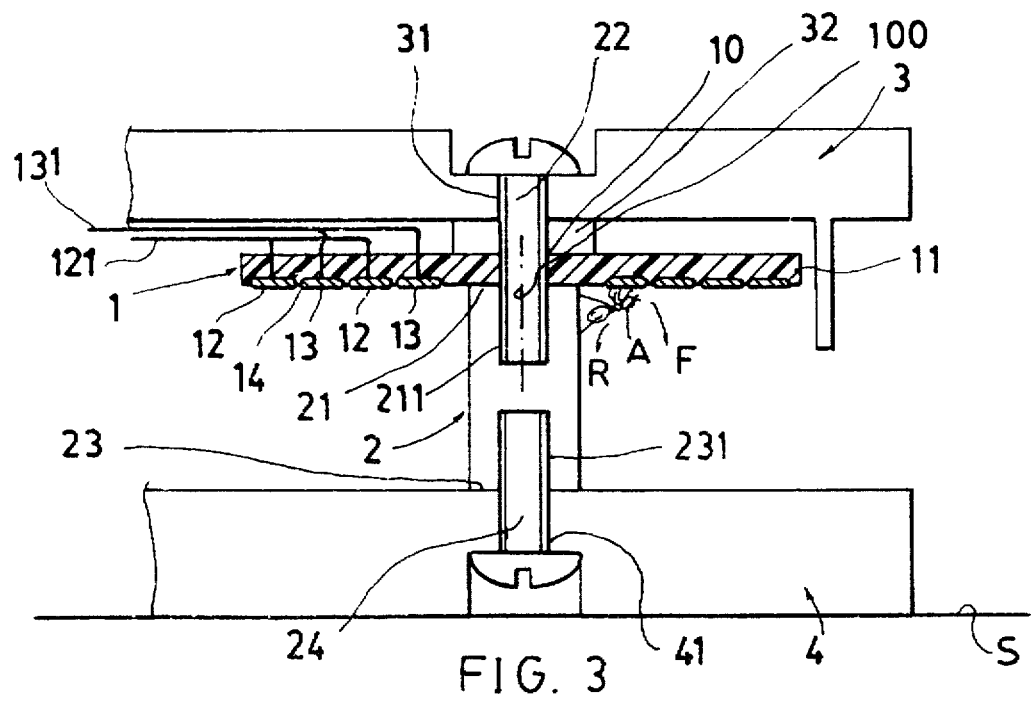
FIG. 3 is a partial sectional drawing of the present invention.
Figure 4:
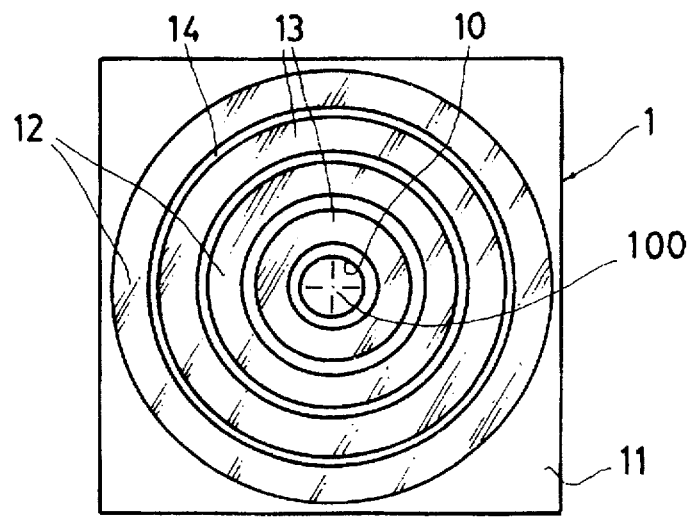
FIG. 4 is a bottom view of the electric shock means of the present invention.
Figure 5:
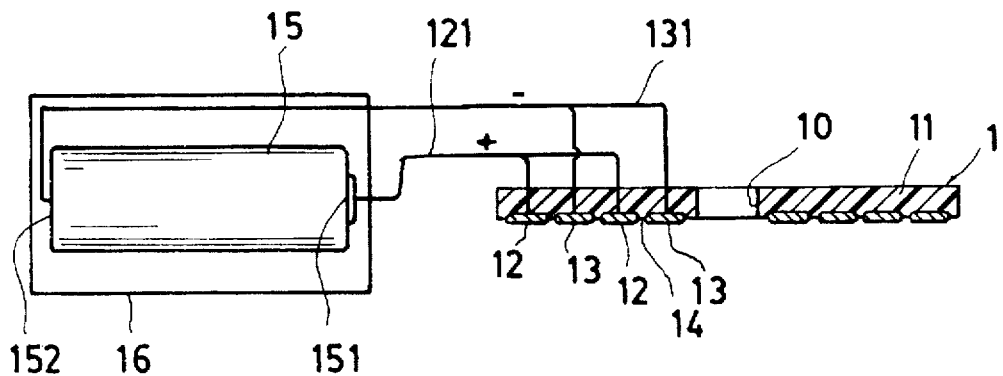
FIG. 5 is a circuit diagram of the present invention.

A packing 32 is inserted between the platform 3 and the circuit board 11 of the electric shock means 1 as shown in FIG. 3 for a convenient wiring for connecting the wires 121, 131 between the electrodes 12, 13 and the power source 15.

The bottom portion 23 of the column 2 may be formed with a lower screw hole 231. The base member 4 may also be formed with a screw hole 41 through the base member 4 for passing a lower screw 24 through the screw hole 41 of the base member 4 and the lower screw hole 231 formed in the bottom portion 23 of the column 2 for mounting the base member 4 on the bottom portion of the supporting column 2 for stabilizing the column 2 and the platform 3 when loaded with a container 5 filled with storing materials 51 in the container 5.

Figure 8:
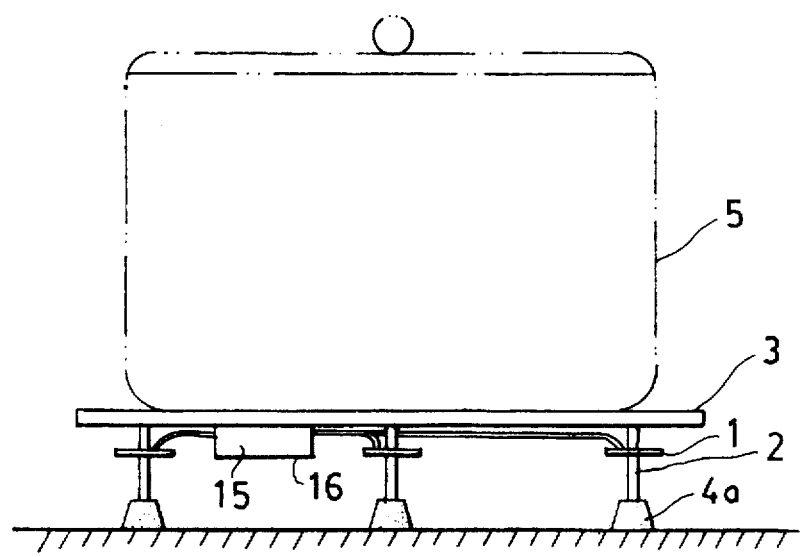
FIG. 8 shows still another preferred embodiment of the present invention.
Figure 9:
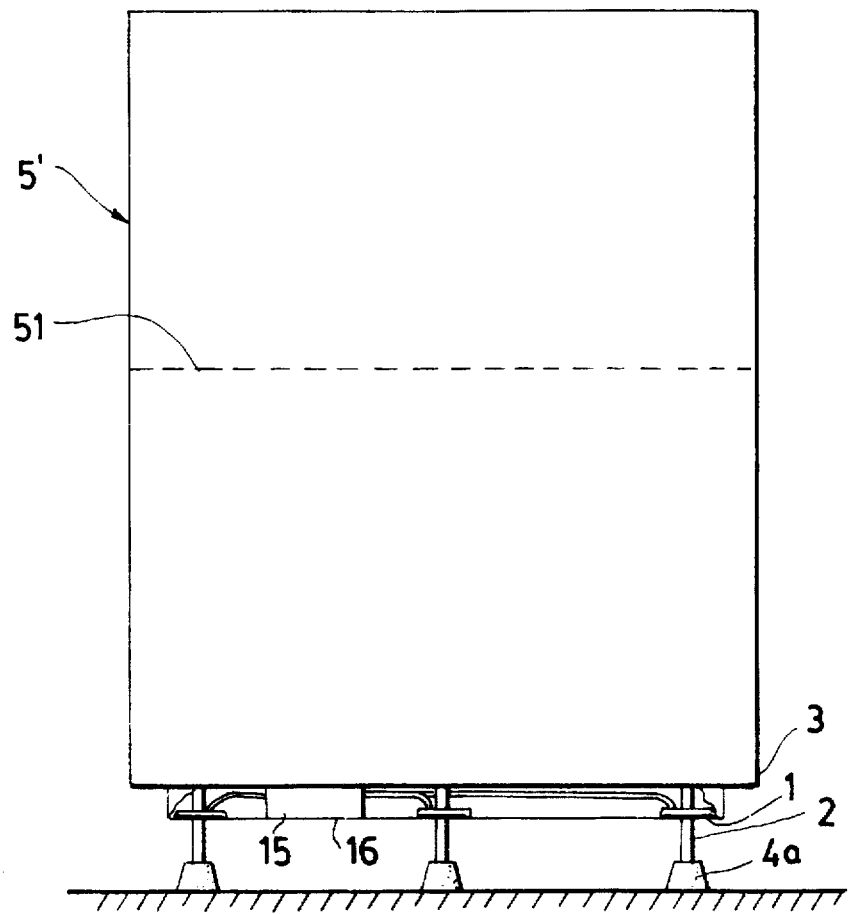
FIG. 9 shows still further preferred embodiment of the present invention.

The base member 4 may be a disk, a plate, a frictional pad, or a cushioning pad 4a as shown in FIG. 8 secured on the bottom portion of the supporting column 2.

When a container 5 with food or sweet matters 51 stored in the container 5 is placed on the platform 3 as shown in FIG. 6, and upon powering of the electrodes 12, 13 of the circuit board 11 on which the electrodes 12, 13 should be formed on a bottom surface of the board 11 downwardly facing the column 2 and the base member 4, an ant A may climb upwardly from a table surface S through the base member 4, the column 2 to reach the board 11 and then creeps over the electrodes 12, 13 on the board 11 as shown in FIG. 3 to be impacted by the electric shock by the voltage across the electrodes, thereby being repelled downwardly through the column 2 in a direction R or falling down in direction F as shown in FIG. 3 in order for preventing an ant invasion into an interior of the container 5 for hygienic purpose.

After a "patrol" or "pioneer" ant is repelled by the electric shock means 1 of the present invention, he will inform the other ants to stop creeping on the apparatus of the present invention. Accordingly, a clean ant-free storing equipment or container will be obtained in accordance with the present invention.

Figure 7:
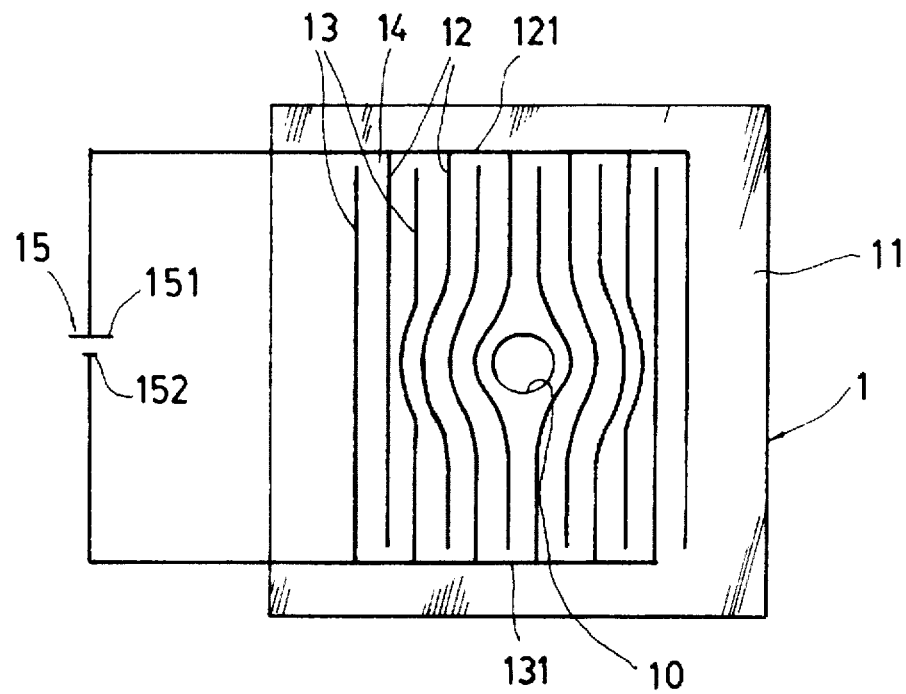
FIG. 7 shows another preferred embodiment of the electric shock means of the present invention.

The electric shock means 1 may be modified to be the arrangement as shown in FIG. 7, in which the electric shock means 1 includes a plurality of first electrodes 12 formed as a grating on a bottom of a circuit board 11 and generally parallelly connected to a first wire 121 electrically connected to a positive pole 151 of the power source 15, a plurality of second electrodes 13 formed as a grating on the bottom of the circuit board 11 and generally parallelly connected to a second wire 131 electrically connected to a negative pole 152 of the power source 15, each first electrode 12 juxtapositional to and separating from each second electrode 13 with an electrically insulative medium 14 spaced between every first electrode 12 and each second electrode 13, and a central hole 10 formed central portion of the circuit board 11 and engaged with a screw fixed on the supporting column 2 for securing the circuit board 11 on the column 2.

The two screws 22, 24 as shown in FIG. 3 may be omitted. The platform 3 and the electric shock means 1 may be directly fixed on a top portion of the column 2 by any conventional joining methods such as adhesive bonding, welding, soldering or the other methods. The base member 4 may also be directly secured to the bottom of the column 2.

The platform 3 as aforementioned may be placed thereon with any container 5. Or, the platform 3 may be modified to form as a bottom part or portion of a device 5' having an ant-attractable materials 51 stored therein, such as: a kitchen cabinet, a storing cabinet, a stand, a beverage or foods vending machine, a microwave stove, a table, or any other containers or equipments which may attract the invasion by ants. The container may also be used as a garbage container, a culture dish, or any other vessels.

The base member 4 may also be modified to be supporting legs, stands, pads (as numeral "4a" *as shown in FIG. 8*), or *any other basic supporting devices.*

The base member 4 may also be eliminated and then the supporting column 2 will directly serve as a supporting foot or base for supporting the present invention.

The present invention is superior to the conventional electric insect repeller with the following advantages:

1. The electric shock means 1 is directly secured on a supporting column 2 and can be made by mass production by a factory production line. The number of the electric shock means 1 and the columns 2 may be varied depending upon the practical requirement for the end uses. Any containers, storing cabinets or equipments can be conveniently placed on the platform 3 for a blockade for preventing invasion by ants.

2. The electrodes 12, 13 are formed on the bottom of the circuit board so that the ant, once subjected to electric shock by the voltage across the electrodes 12, 13, will turn its way (R) backwardly or downwardly or fall down (F) without an upward invasion into the container 5 above the board 11, thereby enhancing an efficient ant repelling.

3. No rib element or wall is required to circumferentially confine the "target" space or container for saving production cost.

4. The electrodes 12, 13 may be integrally formed on the board 11 such as by a printed circuit board for ensuring a product quality, for instance, by precisely making the insulative medium 14 in between every two neighboring electrodes 12, 13 as preformed in a strictly controlled factory production, thereby preventing unexpected short-circuiting between the electrodes when not crept with ant.

The present invention may be modified without departing from the spirit and scope of the present invention. The dimensions of the relevant elements, the voltage and current values of the electric circuit, the arrangement of the electrodes, the number of the elements, the shapes and structures of the present invention are not limited and may be further modified or changed.

I claim:

1. An ant blockading apparatus comprising:
    an electric shock means including a circuit board, a plurality of parallel first electrodes juxtapositionally formed on a bottom of said circuit board, a plurality of parallel second electrodes juxtapositionally formed on the bottom of said circuit board, each said first electrode separating from each said second electrode by an electrically insulative medium spaced between each said first and said second electrode, each said first electrode electrically connected to a positive pole of a power source, and each said second electrode electrically connected to a negative pole of the power source, with said first and second electrodes disposed around a central portion of said circuit board;

a supporting column perpendicularly secured with said central portion of said circuit board of said electric shock means;

a platform secured on an upper portion of said supporting column and positioned above said circuit board for placing a container on the platform having a storing material stored in the container; and a base member secured to a bottom portion of said supporting column;

whereby when an ant crosses the first and second electrodes to reach the platform to close a circuit of said first electrode, said second electrode and said power source, an electric shock by a voltage across said first and second electrodes will be applied to the ant to repel the ant.

2. An ant blockading apparatus according to claim 1, wherein said electric shock means includes: said circuit board made of electrically insulative material having a central hole defined in said central portion of the circuit board, said plurality of first and second electrodes made of electrically conductive annular rings and concentrically formed on said bottom of the circuit board about a center of the board, each said first electrode separating from each said second electrode by an electrically insulative medium annularly shaped and sandwiched between the first and second electrodes, each said first electrode electrically connected to said positive pole of the power source through a first wire, each said second electrode electrically connected to the negative pole of the power source through a second wire, and a casing for storing the power source which is at least a battery in the casing attached to a bottom of the platform.

3. An ant blockading apparatus according to claim 2, wherein said first electrode, said second electrode and said wires connected between the electrodes and the power source are formed as a printed circuit board printed on the circuit board.

4. An ant blockading apparatus according to claim 1, wherein said supporting column is formed with an upper screw hole in an upper portion of said column for inserting an upper screw, through a screw hole formed in the platform and a central hole formed through the circuit board, into the upper screw hole of the column for securing the platform and the circuit board on the upper portion of said supporting column.

5. An ant blockading apparatus according to claim 1, wherein said circuit board of said electric shock means is embedded in a bottom of said platform.

6. An ant blockading apparatus according to claim 1, wherein said platform is positioned above and spaced from said circuit board of said electric shock means by a packing as packed between said platform and said circuit board.

7. An ant blockading apparatus according to claim 4, wherein said supporting column is formed with a lower screw hole in a bottom portion of said column for inserting a lower screw into the lower screw hole through a screw hole formed in a base member for securing the base member on the bottom portion of said column.

8. An ant blockading apparatus according to claim 1, wherein said base member is selected from the group of a disk, a plate, a cushioning pad, a frictional pad, and a base laid on a surface.

9. An ant blockading apparatus according to claim 1, wherein said platform having the supporting column secured thereunder is formed as a bottom part of a device having ant-attractable materials stored therein.

10. An ant blockading apparatus according to claim 9, wherein said supporting column forms a supporting leg of said device.

11. An ant blockading apparatus according to claim 1, wherein said insulative medium has a width smaller than a minimum length of an ant creeping over the electrodes of the circuit board.

12. An ant blockading apparatus according to claim 1, wherein said electrodes, formed on a bottom of the circuit board of the electric shock means, are oriented downwardly to face the column and the base member.

13. An ant blocking apparatus according to claim 1, wherein said electric shock means includes the plurality of first electrodes formed as a first grating on a bottom of said circuit board and connected in parallel to a first wire electrically connected to the positive pole of the power source, said plurality of second electrodes formed as a second grating on the bottom of the circuit board and connected in parallel to a second wire electrically connected to said negative pole of the power source, each said first electrode juxtapositional to and separating from each said second electrode with an electrically insulative medium having a width smaller than a length of an ant and spaced between said first electrode and said second electrode, and a central hole formed in the central portion of the circuit board and engaged with a screw fixed on the supporting column for securing the circuit board on the supporting column.

\* \* \* \* \*